United States Patent
Chen et al.

(12) 
(10) Patent No.: US 6,915,335 B1
(45) Date of Patent: Jul. 5, 2005

(54) SERIAL PROTOCOL FOR EFFICIENT MESSAGING BETWEEN HOST AND INTELLIGENT DAUGHTERCARDS OVER A SERIAL LINK

(75) Inventors: Ming Chi Chen, Union City, CA (US); Robert Chen, Fremont, CA (US); Sanjoy Dey, Fremont, CA (US); James Everett Grishaw, Santa Clara, CA (US); Mick Henniger, Buchanan Dam, TX (US)

(73) Assignee: Cisco Technology, Inc., San Jose, CA (US)

( * ) Notice: Subject to any disclaimer, the term of this patent is extended or adjusted under 35 U.S.C. 154(b) by 759 days.

(21) Appl. No.: 09/955,004

(22) Filed: Sep. 17, 2001

(51) Int. Cl.[7] .............................................. G06F 15/16
(52) U.S. Cl. ...................... 709/213; 709/250; 709/229; 710/8; 710/10; 710/11; 710/15
(58) Field of Search ................................. 709/213, 250, 709/229; 710/8, 10, 11, 15, 27

(56) References Cited

U.S. PATENT DOCUMENTS

| | | | |
|---|---|---|---|
| 6,029,155 A | * | 2/2000 | Bass et al. .................. 705/401 |
| 6,553,441 B1 | * | 4/2003 | Wang et al. .................. 710/64 |
| 2002/0078244 A1 | * | 6/2002 | Howard ...................... 709/248 |

OTHER PUBLICATIONS

*MPC850 Integrated Communications Microprocessor User's Manual* 1998, Chapter 28 "SCC Transparent Mode" pp. 28–1 through 28–14; MPC850UM/D Oct. 1998 Rev. O; Motorola, Inc., Motorola Literature Distribution, P.O. Box 5405, Denver, Colorado 80217, World Wide Web Address: http://ldc.nmd.com/.

* cited by examiner

*Primary Examiner*—Kimberly McLean-Mayo
(74) *Attorney, Agent, or Firm*—Charles E. Krueger

(57) ABSTRACT

A method and apparatus for implementing host management of an intelligent daughtercard utilizes a high-speed serial link and a defined plurality of serial protocol commands to provide high bandwidth control path for management of daughtercard memory and application specific initialization and/or configuration changes.

8 Claims, 5 Drawing Sheets

A 50,000 FT. OVERVIEW OF THE SYSTEM

| Opening Flag | Command Opcode | (optional) Parameters | (optional) Data |
|---|---|---|---|
| 0x7E | 8 bits | | |

Fig. 4A

| Opening Flag | Command Opcode | Length | Address | Data |
|---|---|---|---|---|
| 0x7E | 0x01 | 16 bits | 32 bits | Length * 8 bits |

Fig. 4B

| Opening Flag | Command Opcode | Length † | Address |
|---|---|---|---|
| 0x7E | 0x02 | 16 bits | 32 bits |

Fig. 4C

| Opening Flag | Command Opcode | Open/Close, Address |
|---|---|---|
| 0x7E | 0x08 | 32 bits |

Fig. 4D

| Command | (optional) More Commands | CRC |
|---|---|---|
| 0x7E, Opcode, etc | 0x7E, Opcode, etc | 16 bits |

Fig. 4E

| ID Word | hex 7E80 (16 bits) |
|---|---|
| Length | 4*(N+4) (16 bits) |
| RPQE | 4 longwords |
| Packet Data | N longwords |
| CRC-16 | 16 bits |

Fig. 4F

| ID Word | hex 7E81 (16 bits) |
|---|---|
| Length | hex 0038 (16 bits) |
| Raw Cell | 14 longwords |
| CRC-16 | 16 bits |

Fig. 4G

| ID Word | hex 7E82 (16 bits) |
|---|---|
| Length | hex 0008 (16 bits) |
| TSQE | 2 longwords |
| CRC-16 | 16 bits |

Fig. 4H

| ID Word | hex 7E02 (16 bits) |
|---|---|
| Length | 4*(N+1) (16 bits) |
| Address | 1 longword |
| Data | N longwords |
| CRC-16 | 16 bits |

Fig. 4I

SERIAL PROTOCOL FOR EFFICIENT MESSAGING BETWEEN HOST AND INTELLIGENT DAUGHTERCARDS OVER A SERIAL LINK

BACKGROUND OF THE INVENTION

It is common in microprocessor-based electronic equipment to include two or more interconnected printed circuit boards, often including a main circuit board having a main controller or microprocessor (after termed the "motherboard" or "host") and one or more connected daughtercards. In many electronic devices, some or all of the daughterboards may themselves be "intelligent, i.e., may have their own programmable controllers.

For example, embedded systems which run complex operating systems and applications on a host/motherboard system often depend on intelligent daughtercards (cards controlled by a microprocessor, ASIC, or FPGA) to provide the functionality of a network interface.

One important system requirement is a host/daughtercard interface to transfer data between the host memory and the memory on board the daughtercard. Additionally, the host must be able to manage the memory of the daughtercard and also initialize and reconfigure the daughtercard in response to end user changes to the system.

Often, daughtercards, such as network interface cards or line cards, must be backward compatible to the host system and must use a low-bandwidth legacy host/daughtercard interface, e.g., an 8-bit or 16-bit port, which is not suitable for enabling real-time, efficient, and fast operations. These low-bandwidth legacy parallel interfaces are primarily designed as a control/status interface.

In another scenario, a Direct Memory Access (DMA) controller is used to transfer data between memories resident on the host and daughtercards. While the use of a DMA controller appears to be efficient in terms of data movement, the use of an external controller adds to the cost of goods sold. Further, when designing daughtercards for an existing host system, it may not be possible to design a new, compatible DMA controller.

Accordingly, improved, backward compatible, cost effective techniques for interfacing resident memory on host and daughtercards are required in many technologies.

BRIEF SUMMARY OF THE INVENTION

According to one aspect of the present invention, a serial protocol over a high speed serial communication controller (SCC) overcomes the limitations of legacy interfaces between host and daughtercards.

According to another aspect of the invention, the daughtercard supports a serial messaging protocol and interface to communicate data and control information to and from the host using a messaging system that can support a wide variety of operations.

According to another aspect of the invention, both memory management and application specific management, such as initialization and reconfiguration of the daughtercard by the host, in response to end user actions to initialize or reconfigure the host, are performed over the serial link.

According to another aspect of the invention, memory management functions performed utilizing the serial link include initialization and/or configuration of data structures resident on daughtercard memory.

According to another aspect of the invention, memory management performed utilizing the serial link include management and updating of packet buffers.

According to another aspect of the invention, communications take place over an SCC operating in the transparent mode.

According to another aspect of the invention, either the host or daughtercard can act as a master or slave.

Other features and advantages of the invention will be apparent in view of the following detailed description and appended drawings.

BRIEF DESCRIPTION OF THE DRAWINGS

FIGS. 4A–I are tables describing the formats used in a preferred embodiment of the messaging protocol.

DETAILED DESCRIPTION OF THE INVENTION

Figure 1:
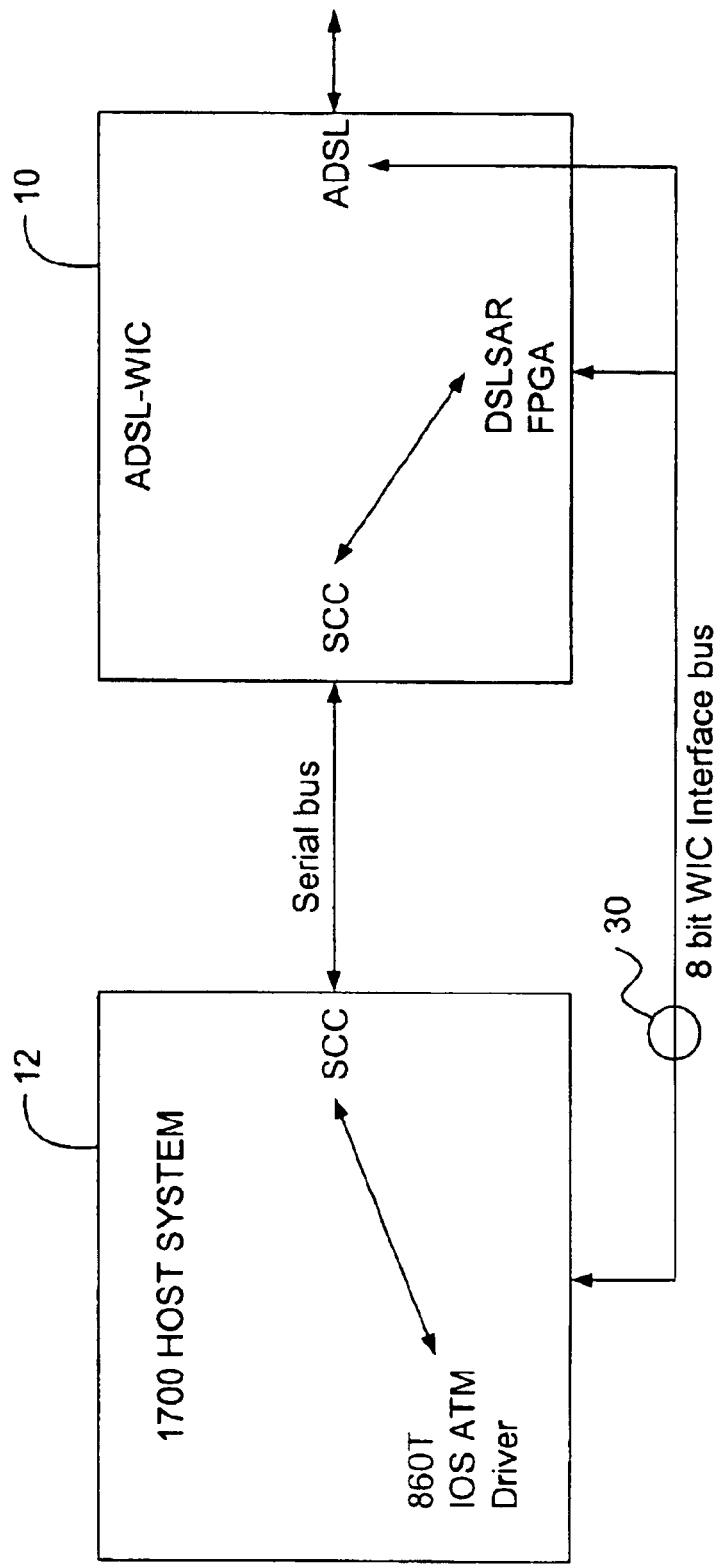
FIG. 1 is a block diagram of an embodiment of the invention depicting the host, daughtercard, and interfaces.

The invention will now be described, by way of example, not limitation, with reference to particular embodiment. In the following an embodiment of the invention, depicted in FIG. 1, is implemented in the context of a WAN Interface Card (WIC) 10 manufactured and designed by the assignee of the present invention. The host 12 is an MPC860 which is a one-chip integrated microprocessor and peripheral combination used as a controller in, for example, networking and communications applications. Both the MPC860 and WIC include serial communication controllers (SCCs).

In the following embodiment both memory management and application specific daughtercard management functions are performed by the host. The memory management functions include the initialization and/or configuration of data structures resident on the memory of the daughtercard and for managing packet buffers and updating packet buffers with data.

In the embodiment described below an example of an application specific configuration command is the OPEN/CLOSE VC command. Very often in network applications, an NIC or the host controlling the NIC is configured by a user. Such configuration updates often require corresponding configuration/initialization changes to the NIC daughtercard. In the embodiment described below, such configuration commands can be carried by the serial link to the daughtercard as a command at run-time of the system. The OPEN/CLOSE VC are examples of two commands that represent actions needed to be taken by the host/daughtercard when the end user configures or deletes a permanent virtual circuit.

Figure 2:
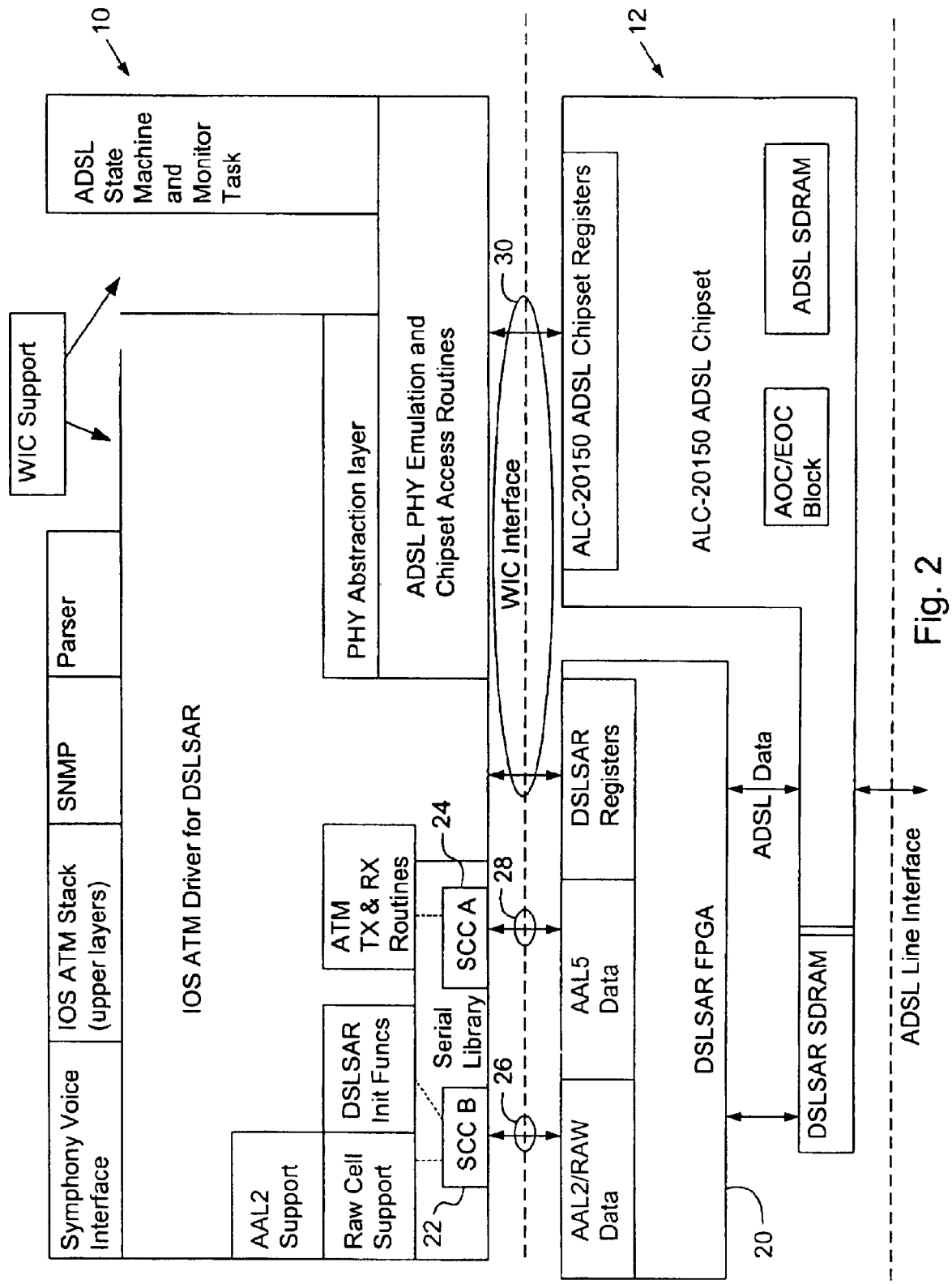
FIG. 2 is a block diagram of the software architecture of the host and the WIC.

FIG. 2 is a block diagram depicting the software architecture of the host and the WIC. The WIC 12 includes a DSL-SAR (Digital Service Line-Segmentation And Reassembly) FPGA (Field Programmable Gate Array) 20. This SAR 20 connects an xDSL bit pump or UTOPIA (Universal Test and Operations PHY Interface for ATM) interface to the host processor's two SCC's 22 and 24 while providing for the Segmentation and reassembly (SAR) of ATM packets.

As depicted in FIG. 2, the two SCC's on the host (SCC B 22 and SCC A 24) control two serial links 26 and 28 to the WIC 10. The parallel WIC interface 30 is used by host to access the DLSAR and ADSL Chipset registers.

The host/daughtercard systems are utilized in ATM/xDSL routers based on the MPC860 processor with connectivity to an Ethernet 10/100 interface and optionally DSP's providing voice services. The memory controller controls SDRAM on the WIC card and arbitrates access between 2 SCCs, the SAR, the scheduler, and the WIC 8-bit interface.

The DSL-SAR provides all the functions needed to interface the internal SDRAM controller, internal SAR, and the on-board xDSL chipset to the host controller (e.g. MPC860) via the SCC's or the standard 8-bit WIC parallel port.

The Host/DSLSAR WIC parallel port interface is an 8-bit asynchronous bus referred to as Parallel bus. The host is always a bus master. The host uses this parallel bus to access the DSL-SAR registers.

The DSL-SAR communicates with the host processor's SCC's via transparent mode. From the host processor's perspective, transparent mode provides a clear channel on which the SCC can send or receive serial data without bit-level manipulation. That is, with the exception of the CRC-16 appended to the end of the frame, any protocols that are run over transparent mode are implemented in software which is stored in a program storage device such as, for example, a disk, tape, semiconductor memory, or digital data encoded in electromagnetic signals.

The transparent mode is implemented as described in the data book entitled "MPC850 Integrated Communications Microprocessor User's Manual", Motorola, Inc., 1998, chap. 28, and is hereby incorporated by reference for all purposes.

Figure 3:
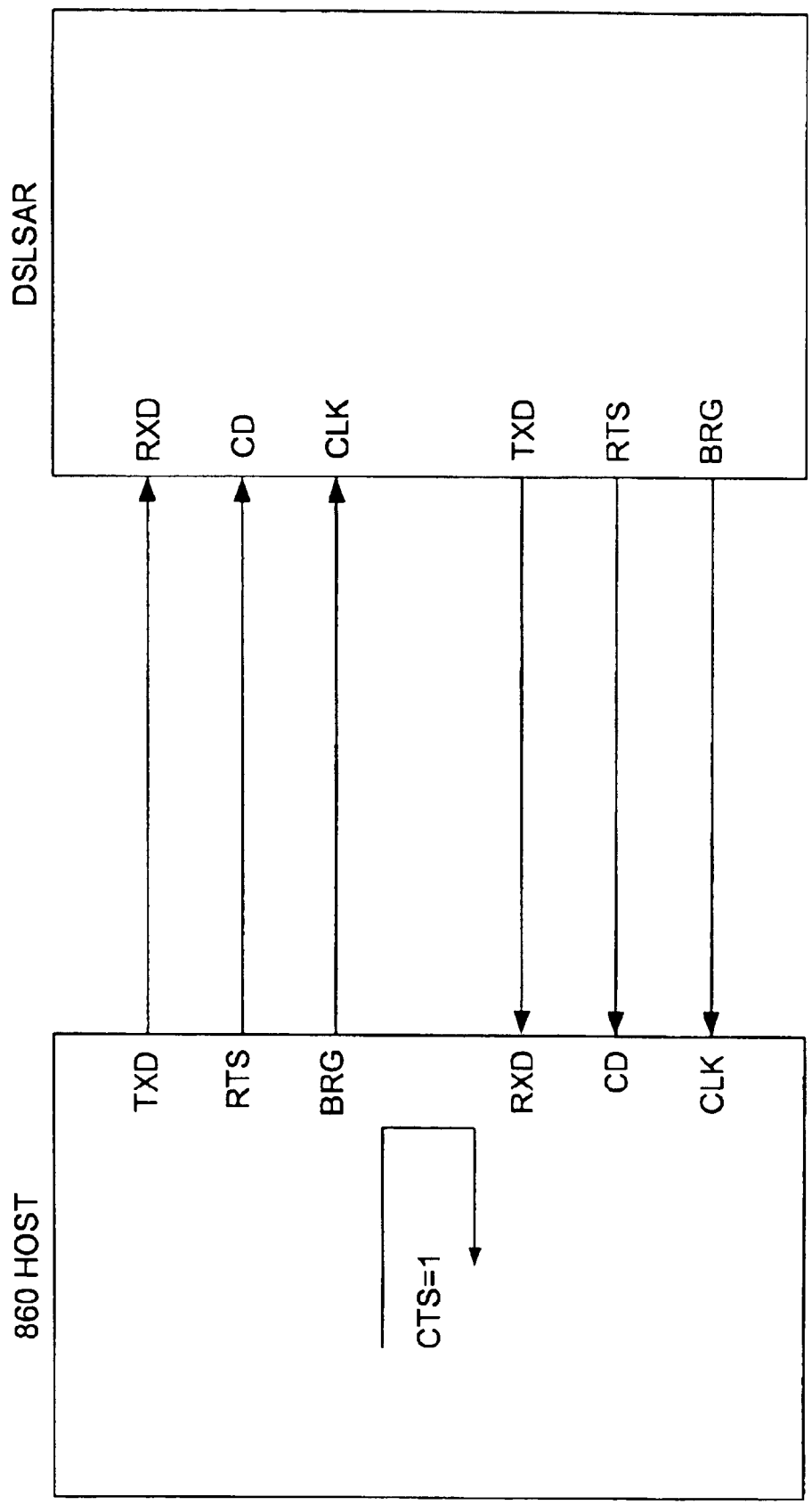
FIG. 3 is a block diagram depicting the signals and signal format used for the SCC.

The signals used to for serial communication-between the DSL-SAR on the WIC and the QUICC (QUad Integrated Communication Controller) are depicted in FIG. 2. In FIG. 3, the transmit clock is generated by the baud rate generator in the QUICC.

The particular serial messaging protocol implemented in this embodiment is based on the functions assigned to the host and WIC. Accordingly, an overview of these functions will now be described.

Packets are received by the host to be transmitted over the DSL line. The host initializes data structures in the SRAM of the WIC and is responsible for memory management of incoming packets. When a new packet comes in at the host, the host processor must first find an unused block of memory of sufficient size in the DSL-SAR's SDRAM. Next, the packet is written to this memory block via one of the SCC channels. The host also can request status reports by writing a Transmit Status Request (TSR) in the transmit channel queue (TCQ). Upon encountering the TSR in the TCQ, the DSL-SAR will place an entry in the Transmit Status Queue (TSQ) and notify the host processor. The host processor can then read the entry and know that the packets for all transmit buffer descriptor's (TBD's) in the TCQ that were before the corresponding TSR have been sent. The host must also have the ability to open and close a virtual channel (VC).

Packets received from the DSL by the WIC must be transmitted to the host by the WIC. Packets assembled by the SAR are automatically sent to the host on one of the SCC channels. Non-AAL5cells are immediately sent to the host as raw cells. ATM Adaption Layer 5(AAL5) cells are assembled by the SAR and the transmitted to the host over an SCC.

The following is a brief summary of the protocol required to support the above-described functionality:

HOST-TO-DAUGHTERCARD
1) Memory Write
Options:
Parameter: length
Address
Data
2) Memory Read
Options:
Parameter: Length
Address
3) Open/Close VC Connection
Options:
Parameter: Open/Close
Address
DAUGHTERCARD-TO-HOST
4) Received packet from network
5) Received RAW cells from network
6) Received Transmit Status Queue Entry
7) Response to Memory Read Referring now to FIGS. 4A–4H, a the protocol will now be described in more detail.

Host-to-SAR Commands and Format

The SCC commands passed from the host processor to the DSL-SAR have the format depicted in FIG. 4A. The 8-bit opening flag is the beginning-of-command (and beginning-of-frame) indicator. There are 3 possible commands: Memory Write, Memory Read, and Open/Close Receive Connection.

The host can write directly to the WIC's on-board SDRAM with the "memory write" command. The "memory write" frame contains two parameters plus the data as shown in FIG. 4B. "Length" is the length of the attached data in bytes. Address is the 32-bit physical SDRAM address. Since the SDRAM controller only does 32-bit accesses, the last two bits of "Address" are unused and should be set to zeros. Also, note that if "Length" is not a multiple of 4, the data written to SDRAM will have 1 to 3 bytes of arbitrary data appended to it. Either SCC will accept the "Memory Write" command.

The host can directly read the WIC's on-board SDRAM with the "memory read" command. The "memory read" frame contains two parameters as shown in FIG. 4C. "Length" is the length of the desired data in bytes. Address is the 32-bit physical SDRAM address. Since the SDRAM controller only does 32-bit accesses, the last two bits of "Address" are unused and should be set to zeros.

In response to the "memory read" command, the DSL-SAR will send a frame containing the requested data up the SCC to the host. The format of this response frame is described below in the "SAR-to-host frame format" section.

In order to guarantee that no data is lost, the host should wait until the "memory read" command is complete before sending the next command down the SCC. This also means that the "Memory Read" command may not be concatenated with any other command (unless the "Memory Read" command is last). Only SCC "A" will accept the "Memory Read" command.

The open/close receive connection command is used to guarantee that the Connection Open bit (bit 19) in the first entry of a VC's Receive Connection Table entry in DSL-SAR memory is set or reset appropriately. Since both the DSL-SAR and the host have access to read and write this entry in the Receive Connection Table, this mechanism has been put into place to guarantee the host the ability to open and close a VC's connection.

The frame format for this command is shown in FIG. 4D.

Host-to-SAR Frame Format

The frame, as depicted in FIG. 4E, consists of one or more commands followed by the host processor's hardware-generated CRC-16. In order to check data integrity, each command is expected to start with the Opening Flag (0x7E). Note, however, that since 0x7E is only checked for where the beginning of a command is expected, 0x7E may exist anywhere else in the frame without causing any erratic behavior. In the event that 0x7E is not encountered where the beginning of a command is expected, the entire rest of the frame is discarded (up to where CD# goes high). This also occurs if the opcode is not one of the three listed above.

In the event that CD# goes high prematurely, the current command is aborted and all other commands are ignored until the end of the frame is reached. An incorrect CRC-16 will cause the SCC Error Counter to be incremented, and the command will be aborted if possible.

SAR-to-Host Frame Format

As described above, the DSL-SAR is in charge of automatically transmitting several types of information to the host:

Received packets and Received Packet Queue Entries (RPQE's)
Raw Cells from the Raw Cell Queue
Transmit Status Queue Entries (TSQE's)
The data requested from a Memory Read command Each frame sent to the host will begin with a 16-bit ID word which uniquely identifies content of the rest of the frame before the body of data is transmitted.

Received packet frames, depicted in FIG. 4F, consist of the ID word, the RPQE, and then the packet data. The ID word for received packets is hex 7E80. The length field is the length in bytes of the received packet queue entry (RPQE) and Packet Data fields. Only SCC "A" will transmit received packets to the host.

Raw cells, depicted in FIG. 4G, are transmitted as 16 longwords according to the Raw Cell Format. The ID word for raw cells is hex 7E81, and the length field is the length of the "Raw Cell" field (56 bytes).

Only SCC "B" will transmit Raw Cells to the host.

Transmit status queue entries (TSQUEs) are depicted in FIG. 4H. The ID word for TSQE's is hex 7E82, and the length field is the length of the "TSQE" field (8 bytes). Only SCC "B" will transmit TSQE's to the host.

The response from a "memory read" command, depicted in FIG. 4I, will also contain the 32-bit start address of the requested data. The ID word for "memory read" is hex 7E02, and the length field is the length of the address and data fields in bytes. The SCC that received the "Memory Read" command will send the "Memory Read" response back to the host Thus, access to shared memory on the WIC card is provided to both the host and the DSL-SAR by utilizing the high-speed serial channel. The legacy parallel interface is used only for functions not requiring high-bandwidth. The use of the serial channel allows intelligent functionality to be distributed between cards requiring shared memory access without the limitations inherent in parallel memory interfaces. For example, if the cards are remotely located it is not feasible to design a parallel interface or, if the existing parallel interface has insufficient bandwidth it may be impossible to increase the bandwidth because of backward compatibility requirements.

In the above example, the high speed SCC between the host and to daughtercard allowed the daughtercard to receive data at a high bandwidth and preprocess the data for use by the host. The preprocessed data is stored in the memory on board the WIC. The high speed SCC and serial messaging protocol facilitates high speed access to the WIC memory by the host.

The serial protocol is designed to support the requirements dictated by the distributed functionality of the cards. In the above example, the protocol supported the requirements of a DSL-SAR on a daughterboard and a communication control processor on the motherboard The interface of the present invention is suitable for use in many different contexts.

The invention has now been described with reference to the preferred embodiments. Alternatives and substitutions will now be apparent to persons of skill in the art. In particular, the above embodiment utilizes the transparent mode of the QICC of the MPC860. However, as will be understood by persons of skill in the art, other SCCs and serial modes may be utilized to practice the invention. Further, although the described embodiment is a network interface card the principles of the invention are applicable host/daughtercard systems in general and can be advantageously employed when legacy parallel interfaces have insufficient bandwidth or when devices are not co-located and a parallel interface can not be implemented. Also, the specific encapsulation format described above to implement commands is not required to practice the invention and can be implemented in many formats as is known in the art. Accordingly, it is not intended to limit the invention except as provided by the appended claims.

What is claimed is:

1. A system for transferring control and data information between a host and daughtercard, with the daughtercard providing the functionality of interfacing the host to a network, and with the daughtercard including memory, and with the daughtercard for processing and formatting network data received from the network and processing and formatting data received from the host prior to transmission on the network, said system comprising:

a low-speed, legacy parallel bus for coupling the host with legacy daughtercards utilizing only a parallel interface to exchange information between the motherboard and legacy daughtercard and with the low-speed, legacy parallel interface utilized to perform low-bandwidth data exchanges between the motherboard and a non-legacy daughtercard coupled the low-speed, legacy parallel bus;

a high bandwidth serial link coupling the host and non-legacy daughtercard;

on the host:
a host serial communication controller for transmitting and receiving data over the serial link;
a host processor programmed to implement a serial messaging protocol for transmitting commands and data to the non-legacy daughtercard, over the serial link, including a write memory command that writes data to the memory on the daughtercard and a read memory command that identifies data to be read from the memory on the non-legacy daughtercard;

on the non-legacy daughtercard:
a daughtercard serial interface for transmitting and receiving data over the serial link;
a daughtercard protocol controller programmed to implement a serial messaging protocol to respond to commands received from the host, including responding to memory read and write commands and for forwarding formatted data received from the network to the host.

2. The system of claim 1 where the daughtercard protocol controller is a field programmable gate array (FPGA).

3. The system of claim 1 where the daughtercard protocol controller is an application specific integrated circuit (ASIC).

4. A method for managing an intelligent daughtercard, with the daughtercard including memory, by a host comprising providing a serial link between the host and daughtercard;

defining a plurality of serial protocol commands forming a serial protocol enabling daughtercard management operations to be performed utilizing the serial link;

where the step of defining a plurality of serial protocol commands further comprises:

defining memory management serial protocol commands for enabling the host to manage memory on-board the daughtercard; and defining application dependent serial protocol for enabling the host to initialize and/or change the configuration of the daughtercard;

where the step of defining memory management serial protocol commands further comprises:

defining memory management serial protocol commands for initializing and/or updating data structures resident in daughtercard memory; and defining memory management serial protocol commands to manage and/or update packet buffers with network data; and specifying a command encapsulation format to encode the plurality of commands to implement the serial protocol.

5. The method of claim 4 where the step of defining application dependent serial protocol commands includes the steps of:

defining application dependent serial command for initialization and/or configuration of the daughtercard to correspond to user initiated initialization and/or configuration changes performed by a user at the host.

6. A system for managing an intelligent daughtercard, with the daughtercard including memory, by a host comprising:

means for providing a serial link between the host and daughtercard;

means for defining a plurality of serial protocol commands forming a serial protocol enabling daughtercard management operations to be performed utilizing the serial link;

where the means for defining a plurality of serial protocol commands further comprises:

means for defining memory management serial protocol commands for enabling the host to manage memory on-board the daughtercard; and means for defining application dependent serial protocol for enabling the host to initialize and/or change the configuration of the daughtercard; and means for specifying a command encapsulation format to encode the plurality of commands to implement the serial protocol.

7. The system of claim 6 where the means for defining memory management serial commands further comprises:

means for defining memory management serial protocol commands for initializing and/or updating data structures resident in daughtercard memory; and means for defining memory management serial protocol commands to manage and/or update packet buffers with network data.

8. The system of claim 7 where the step of defining application dependent serial protocol commands comprises:

means for defining application dependent serial command for initialization and/or configuration of the daughtercard to correspond to user initiated initialization and/or configuration changes performed by a user at the host.

* * * * *